United States Patent
Moon et al.

(10) Patent No.: US 10,866,873 B2
(45) Date of Patent: Dec. 15, 2020

(54) DISPLAY DEVICE AND DRIVING METHOD THEREOF

(71) Applicant: LG DISPLAY CO., LTD., Seoul (KR)

(72) Inventors: Myungkook Moon, Paju-si (KR); Semin Koong, Paju-si (KR); Haejong Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/509,130

(22) Filed: Jul. 11, 2019

(65) Prior Publication Data
US 2020/0019482 A1    Jan. 16, 2020

(30) Foreign Application Priority Data

Jul. 12, 2018   (KR) ................. 10-2018-0081203

(51) Int. Cl.
| | |
|---|---|
| *G06F 11/30* | (2006.01) |
| *G09G 3/20* | (2006.01) |
| *B60W 50/14* | (2020.01) |
| *B60K 37/02* | (2006.01) |

(52) U.S. Cl.
CPC ......... *G06F 11/3051* (2013.01); *B60W 50/14* (2013.01); *G09G 3/2092* (2013.01); *B60K 37/02* (2013.01); *B60K 2370/154* (2019.05); *B60K 2370/155* (2019.05); *B60W 2050/146* (2013.01)

(58) Field of Classification Search
CPC ........ B60K 2370/154; B60K 2370/155; B60K 35/00; B60K 37/02; B60W 2050/146; B60W 50/14; G06F 11/3051; G09G 2380/10; G09G 3/2092; G09G 5/003
See application file for complete search history.

(56) References Cited

U.S. PATENT DOCUMENTS

| | | | | |
|---|---|---|---|---|
| 2011/0285730 A1* | 11/2011 | Lai | ............ | G09G 3/2092 |
| | | | | 345/536 |
| 2012/0086681 A1* | 4/2012 | Kim | ............ | G09G 3/3648 |
| | | | | 345/204 |
| 2012/0139882 A1* | 6/2012 | Kim | ............ | G09G 5/008 |
| | | | | 345/204 |

(Continued)

FOREIGN PATENT DOCUMENTS

KR   10-2018-0032109 A   3/2018

*Primary Examiner* — Hong Zhou
(74) *Attorney, Agent, or Firm* — Birch, Stewart, Kolasch & Birch, LLP

(57) ABSTRACT

A display device includes a display panel including a plurality of data lines; a plurality of data drive ICs configured to provide data voltages to the data lines; and a controller configured to rearrange video data received from an external device and transmit region-wise video data to the plurality of data drive ICs, to receive coordinates of information regions included in the video data and store video data of the information regions in advance, to calculate a checksum for checking an error in the region-wise video data based on the coordinates, to transmit the coordinates and the checksum to the data drive ICs and receive feedbacks about comparison results with respect to the checksum, and when a data drive IC that has failed is confirmed based on the feedback results, to update video data of the information region displayed by the data drive IC to region-wise video data of a normal data drive IC and output the video data.

11 Claims, 10 Drawing Sheets

(56) References Cited

U.S. PATENT DOCUMENTS

| | | | |
|---|---|---|---|
| 2014/0078133 A1* | 3/2014 | Lee | G09G 3/2092 345/213 |
| 2016/0027406 A1* | 1/2016 | Fiedler | G09G 5/14 345/501 |
| 2016/0189595 A1* | 6/2016 | Choi | G09G 3/2074 345/212 |
| 2016/0307346 A1* | 10/2016 | Staudenmaier | G06T 3/0093 |
| 2016/0307544 A1* | 10/2016 | Lin | G09G 5/363 |
| 2017/0263204 A1* | 9/2017 | Tanaka | G09G 3/3677 |
| 2018/0122295 A1* | 5/2018 | Kim | G09G 3/20 |

\* cited by examiner

DISPLAY DEVICE AND DRIVING METHOD THEREOF

This application claims the priority benefit of Korean Patent Application No. 10-2018-0081203 filed in the Republic of Korea on Jul. 12, 2018, which is incorporated herein by reference for all purposes as if fully set forth herein.

BACKGROUND OF THE INVENTION

Field of the Invention

The present invention relates to a display device and a driving method thereof.

Related Art

Active matrix type display devices display images using a thin film transistor (hereinafter referred to as "TFT") as a switching element. Such display devices can be designed to be small and light and thus are widely used for various applications providing visual information as well as TVs and monitors. Gauges for displaying information about traveling of vehicles have also changed from analog display devices that provide information using needles to digital display devices.

These display devices generally include a panel for displaying images, gate drive ICs, data drive ICs and a timing controller.

The timing controller provides video data, clocks for sampling of video data, and a control signal for controlling data drive ICs to one or more data drive ICs. The data drive ICs convert digital video data input from the timing controller into analog data voltages and provide the analog data voltages to data lines of the display panel. When some of these components have failed, normal images cannot be displayed on the area corresponding thereto.

Since display devices for vehicles display status information about vehicles which is directly linked to safety, such as fuel information, battery information and door open/close state, normal driving may not be performed and safety of drivers can be threatened if such important information is not displayed.

SUMMARY OF THE INVENTION

The present invention provides a display device capable of moving important information among information displayed in a certain area of the display device to a displayable area and displaying the important information in the displayable area when the certain area cannot be normally displayed, and a driving method thereof.

A display device according to an embodiment of the present invention includes a display panel; a plurality of data drive ICs configured to provide data voltages to data lines of the display panel; and a controller configured to rearrange video data received from an external device and transmit region-wise video data to the plurality of data drive ICs, to receive coordinates of information regions included in the video data and store video data of the information regions in advance, to calculate a checksum for checking an error in the region-wise video data based on the coordinates, to transmit the coordinates and the checksum to the data drive ICs and receive feedbacks about comparison results with respect to the checksum, and when a data drive IC that has failed is confirmed based on the feedback results, to update video data of the information region displayed by the data drive IC to region-wise video data of a normal data drive IC and output the video data.

A driving method of a display device according to an embodiment of the present invention is a driving method of a display device including a display panel, a plurality of data drive ICs configured to provide data voltages to data lines of the display panel and a controller configured to rearrange video data received from an external device and to transmit region-wise video data to the plurality of data drive ICs, the driving method including receiving coordinates of information regions included in the video data; storing video data of the information regions; calculating a checksum for checking an error in the region-wise video data based on the coordinates; transmitting the coordinates and the checksum to the data drive ICs and receiving feedbacks about comparison results with respect to the checksum; and when a data drive IC that has failed is confirmed based on the feedback results, updating video data of the information region displayed by the data drive IC to region-wise video data of a normal data drive IC and outputting the video data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DESCRIPTION OF EXEMPLARY EMBODIMENTS

The advantages, features and methods for accomplishing the same of the present invention will become more apparent through the following detailed description with respect to the accompanying drawings. However, the present invention is not limited by embodiments described blow and is implemented in various different forms, and the embodiments are provided so that this disclosure will be thorough and complete, and will fully convey the scope of the invention to those skilled in the art. The present invention is defined by the scope of the claims.

Shapes, sizes, ratios, angles, numbers, etc. shown in the figures to describe embodiments of the present invention are exemplary and thus are not limited to particulars shown in the figures. Like numbers refer to like elements throughout the specification. It will be further understood that when the terms "include", "have" and "comprise" are used in this specification, other parts may be added unless "~only" is used. An element described in the singular form is intended to include a plurality of elements unless context clearly indicates otherwise.

In interpretation of a component, the component is interpreted as including an error range unless otherwise explicitly described.

It will be understood that, when an element is referred to as being "on" or "under" another element, it can be "directly" on or under another element or can be "indirectly" formed such that an intervening element is also present.

In the following description of the embodiments, "first" and "second" are used to describe various components, but such components are not limited by these terms. The terms are used to discriminate one component from another component. Accordingly, a first component mentioned in the following description may be a second component within the technical spirit of the present invention.

The same reference numbers refer to the same components throughout this specification.

Hereinafter, embodiments of the present invention will be described in detail with reference to the attached drawings. In the following description, if a detailed description of known techniques associated with the present invention would unnecessarily obscure the gist of the present invention, detailed description thereof will be omitted.

Figure 1:
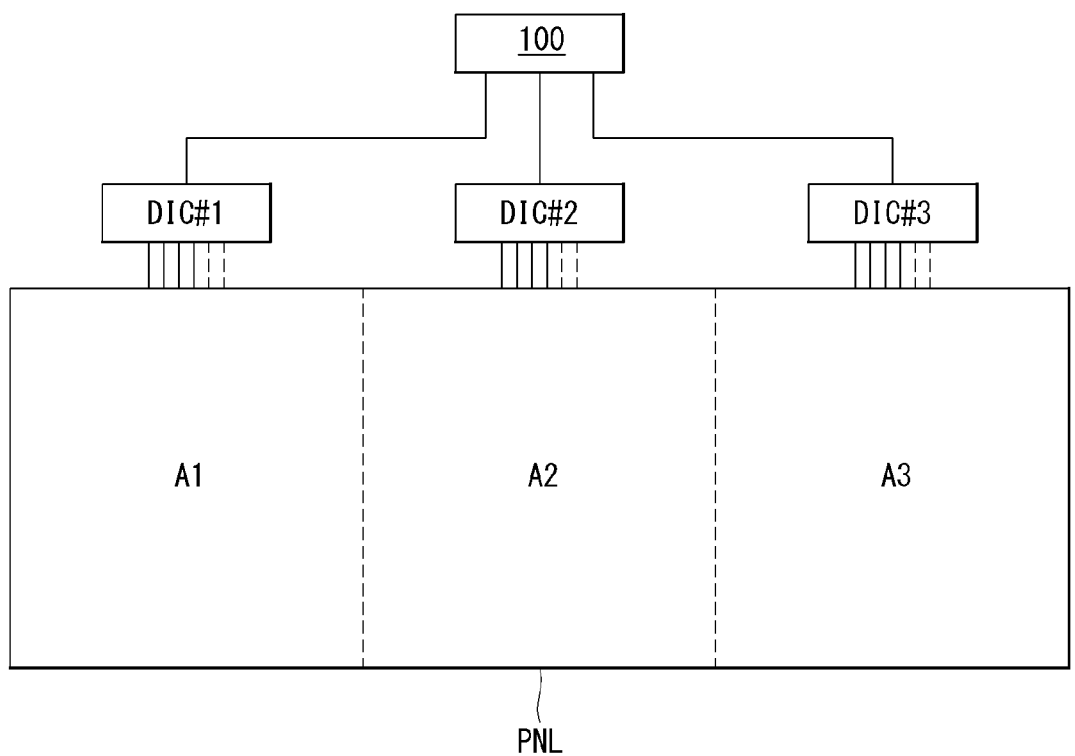
FIG. 1 is a diagram showing a display device according to an embodiment of the present invention.

FIG. 1 is a diagram showing a display device according to an embodiment of the present invention. All the components of the display device according to all embodiments of the present invention are operatively coupled and configured.

Referring to FIG. 1, the display device according to the embodiment of the present invention includes a display panel PNL, a controller 100 and one or more data drive ICs DIC #1 to DIC #3.

The display panel PNL can include a plurality of pixels formed at pixel regions defined by intersections of a plurality of gate lines and a plurality of data lines. The display panel PNL can include a liquid crystal display (LCD), a thin film transistor-liquid crystal display (TFT-LCD) and an organic light-emitting diode (OLED).

The controller 100 receives external timing signals such as vertical/horizontal synchronization signals Vsync and Hsync, an external data enable signal DE and a main clock CLK, and video data from an external system through an interface such as a low voltage differential signaling (LVDS) interface. The controller 100 generates control signals for operations of gate drive ICs and the data drive ICs based on the external timing signals, rearranges the video data and transmits the video data to the data drive ICs DIC #1 to DIC #3.

In addition, the controller 100 according to the embodiment of the present invention receives coordinates of important information regions from the system and calculates a checksum C/S for checking whether the video data has an error based on the received coordinates of the important information regions. When the display device displays information related to a vehicle, the important information region can be telltales that indicate turn-off of a safety control device, caution for temperature, anti-lock braking system (ABS), insufficiency of an oil pressure, and the like.

The controller 100 transmits the coordinates of the telltales and the checksum C/S to the data drive ICs DIC #1 to DIC #3. Then, the controller 100 receives feedbacks about whether the video data has an error from the data drive ICs DIC #1 to DIC #3 through an I2C interface or the like. Further, the controller 100 can receive feedbacks about whether communication has failed from the data drive ICs DIC #1 to DIC #3. The controller 100 can determine a data drive IC related to a communication failure or display of an abnormal image based on the feedback results. The controller 100 can transmit information on a telltale displayed by the data drive IC that is abnormally operating to a data drive IC that is normally operating.

The data drive ICs DIC #1 to DIC #3 convert input video data received from the controller 100 into positive/negative analog video data voltages and provide the positive/negative analog video data voltages to the data lines of the display panel PNL. The first data drive IC DIC #1 can provide a data voltage to data lines of a first display area A1, the second data drive IC DIC #2 can provide a data voltage to data lines of a second display area A2 and the third data drive IC DIC #3 can provide a data voltage to data lines of a third display area A3. Accordingly, when some of the data drive ICs DIC #1 to DIC #3 have failed, an abnormal image is displayed or an image is not displayed in display areas corresponding thereto.

The data drive ICs DIC #1 to DIC #3 according to the embodiment of the present invention feed back whether communication with the controller 100 has failed to the controller 100. In addition, the data drive ICs DIC #1 to DIC #3 receive the coordinates of the telltales and the checksum C/S from the controller 100. The data drive ICs DIC #1 to DIC #3 check whether the coordinates of the telltales and the checksum C/S provided by the controller 100 are consistent with checksums C/S of video data displayed by the data drive ICs and feed back whether the video data has an error to the controller 100.

Figure 2:
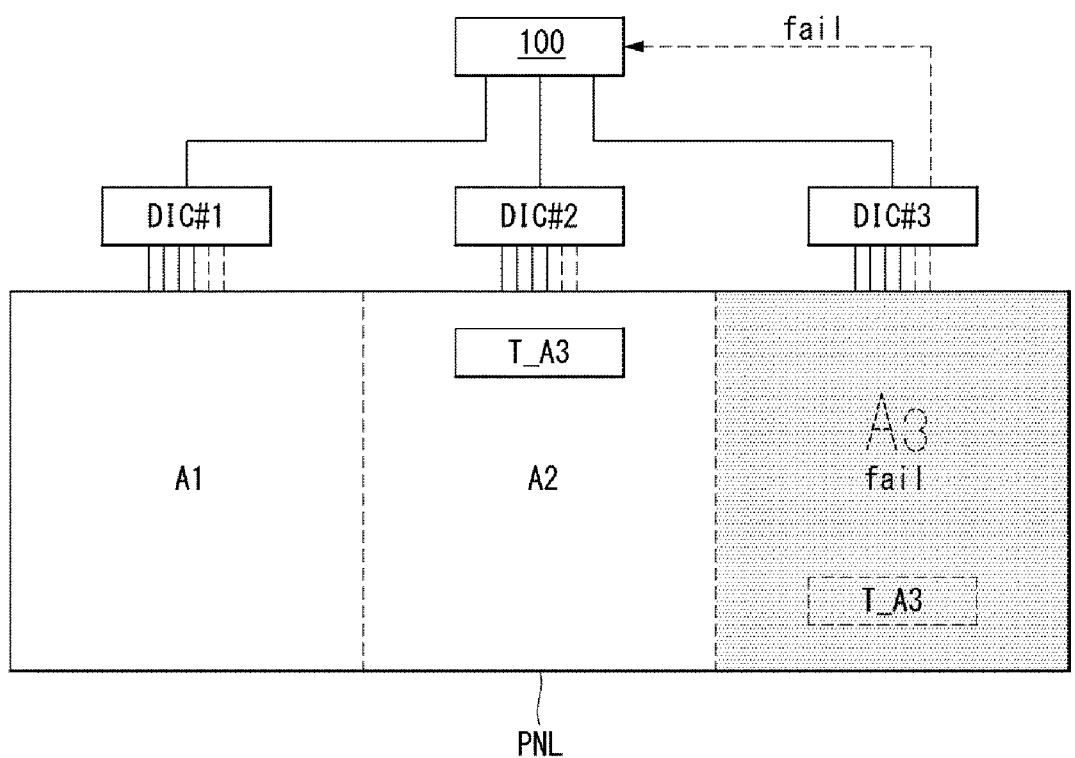
FIG. 2 is a diagram showing a state in which a certain component of the display device of FIG. 1 has failed.

FIG. 2 is a diagram showing a state in which a certain component of the display device of FIG. 1 has failed and illustrates a case in which the third data drive IC DIC #3 has failed as an example.

Referring to FIG. 2, since the third data drive IC DIC #3 provides a data voltage to the data lines of the third display area A3, an abnormal image is displayed or an image is not displayed (fail) in the third display area A3 when the third data drive IC DIC #3 has failed.

The third display area A3 can include a telltale T_A3 that is a warning light indicating a vehicle state. The telltale T_A3 can indicate turn-off of a safety control device, caution for temperature, an anti-lock braking system, insufficiency of an oil pressure, and the like.

The controller 100 rearranges video data input from the external system such that the video data can be transmitted to the data drive ICs DIC #1 to DIC #3. The external system also provides coordinates indicating the locations of telltales. As an example, a telltale can be a device or element that provide an indication of a state, status or some information. When the controller 100 rearranges the video data, the controller 100 calculates a checksum C/S of the video data based on the coordinates of the telltales for each of the data drive ICs DIC #1 to DIC #3. The controller 100 stores the calculated checksum C/S and video data of the telltales in advance. The controller 100 transmits the rearranged video data, the coordinates of the telltales and the checksum C/S to the data drive ICs DIC #1 to DIC #3 and then receives feedbacks about whether communication has failed and whether the video data has an error from the data drive ICs DIC #1 to DIC #3.

The controller 100 can recognize that the third data drive IC DIC #3 has failed from the feedback results. The controller 100 adds the video data of the telltale T_A3 displayed in the third display area A3 to video data provided to the second data drive IC DIC #2. Accordingly, the second data drive IC DIC #2 can additionally display the telltale T_A3 displayed in the third display area A3 in the second display area A2.

As described above, when a part of the display panel PNL has failed and thus a telltale cannot be displayed therein, the telltale can be moved and displayed in a displayable area such that the telltale can be continuously provided to a driver.

Figure 3:
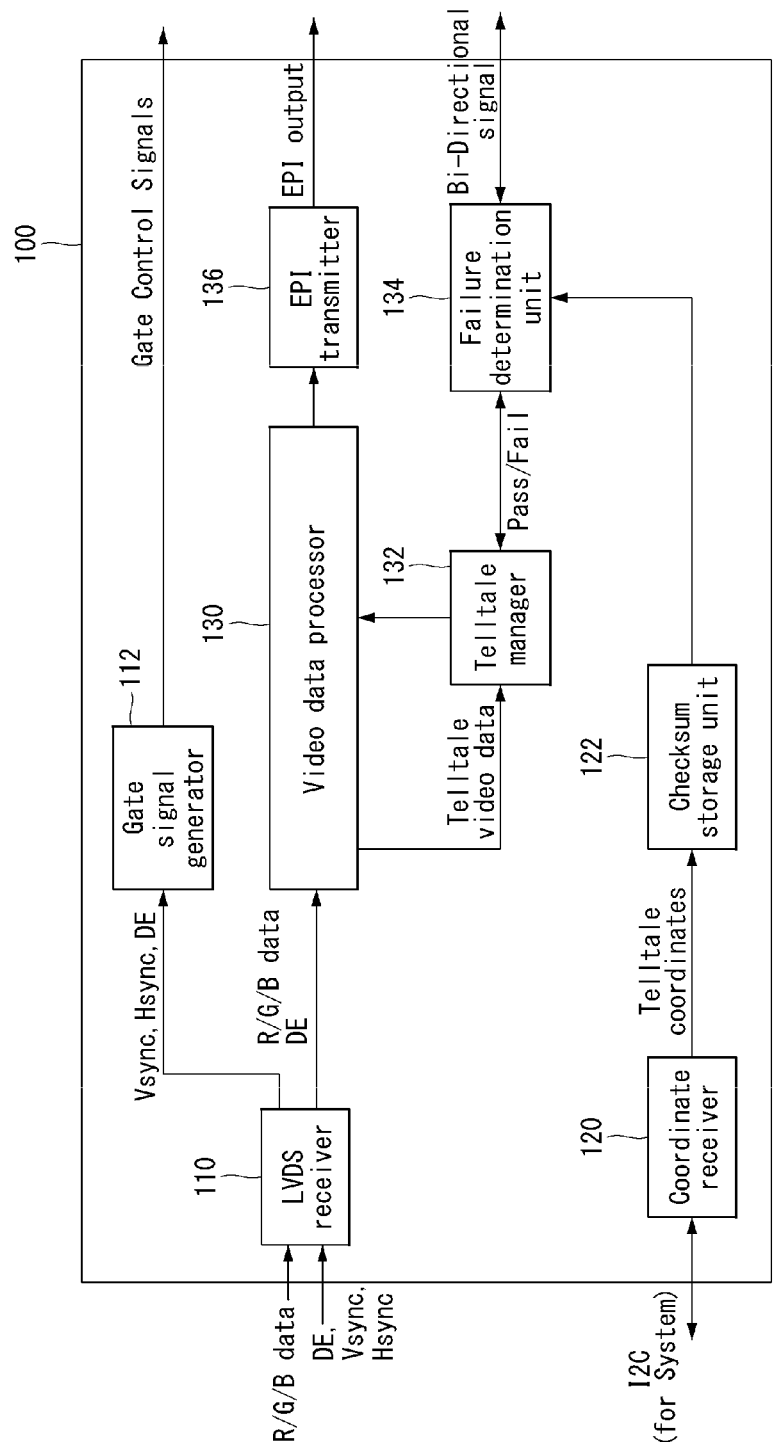
FIG. 3 is a control block diagram for describing a configuration of a controller of FIG. 1.

FIG. 3 is a control block diagram for describing a configuration of the controller 100 of FIG. 1.

Referring to FIG. 3, the controller 100 includes an LVDS receiver 110 that receives video data (R/G/B data) and the control signals DE, Vsync and Hsync from the external system, a coordinate receiver 120 that receives coordinate information indicating locations of telltales, a gate signal generator 112, a checksum storage unit 122, a failure determination unit 134, a telltale manager 132, an EPI transmitter 136, and a video data processor 130 that selects a display position of a telltale and displays the telltale according to whether any of the data drive ICs DIC #1 to DIC #3 has failed.

The LVDS receiver 110 receives the video data (R/G/B data) and the control signals DE, Vsync and Hsync through an LVDS interface. The LVDS receiver 110 transmits the control signals DE, Vsync and Hsync received from the external system to the gate signal generator 112 and transmits the video data (R/G/B data) and the control signal DE to the video data processor 130.

The gate signal generator 112 generates a gate control signal based on the received control signals DE, Vsync and then Hsync and outputs the gate control signal to the gate drive ICs of the display panel PNL.

The video data processor 130 can be connected to the data drive ICs DIC #1 to DIC #3 using an embedded clock point-point interface (hereinafter referred to as "EPI") protocol. The EPI protocol does not connect additional clock line pairs between the EPI transmitter 136 and the data drive ICs DIC #1 to DIC #3. The video data processor 130 transmits an EPI data signal to the data drive ICs DIC #1 to DIC #3 through data line pairs. The EPI data signal is obtained by converting a clock training pattern, control data and video data into a difference signal pair, and the video data processor 130 can serially transmit the EPI data signal to the data drive ICs DIC #1 to DIC #3 through data line pairs. Although the video data processor 130 can be connected to the data drive ICs DIC #1 to DIC #3 using the EPI protocol as described above, various protocols for allowing bidirectional communication can be used and the present invention is not limited to a specific method.

When the video data processor 130 of the present invention rearranges video data in order to transmit the video data to the data drive ICs DIC #1 to DIC #3, the video data processor 130 copies only video data of a telltale displayed with respect to each of the data drive ICs DIC #1 to DIC #3 and stores the copied video data in the telltale manager 132. In this manner, only video data that needs to be displayed can be stored to save a system memory and improve a processing speed.

The coordinate receiver 120 receives coordinates of telltales provided by the external system. The coordinate receiver 120 receives the coordinates of the telltales from the external system through an I2C interface and delivers the coordinates to the checksum storage unit 122

The checksum storage unit 122 calculates and stores a checksum C/S by which an error in video data can be checked based on the coordinates of the telltales. Here, a checksum value is calculated for the area of each of the data drive ICs DIC #1 to DIC #3.

The failure determination unit 134 transmits the checksum C/S to the data drive ICs DIC #1 to DIC #3 and receives comparison results with respect to the checksum C/S from the data drive ICs DIC #1 to DIC #3. Here, the data drive ICs DIC #1 to DIC #3 can determine whether the checksum C/S received from the failure determination unit 134 is consistent with checksums C/S of video data that is being provided to the data lines and feed back determination results OK/NG to the failure determination unit 134. The data drive ICs DIC #1 to DIC #3 can feed back whether signal transmission/reception to/from the EPI transmitter 136 has failed to the failure determination unit 134.

The failure determination unit 134 can determine a data drive IC that has failed based on checksum determination results and whether signal transmission/reception has failed which are fed back from the data drive ICs DIC #1 to DIC #3. The failure determination unit 134 transmits information on the data drive IC that has failed to the telltale manager 132. Further, the failure determination unit 134 also transmits the information on the data drive IC that has failed to the telltale manager 132 when a signal transmission/reception failure is fed back from the data drive ICs DIC #1 to DIC #3.

The telltale manager 132 provides video data of a telltale displayed by the data drive IC determined to have failed among video data of telltales stored in advance to the video data processor 130.

The video data processor 130 updates the video data of the telltale received from the telltale manager 132 to video data of a normally operating data drive IC and transmits the video data to the normally operating data drive IC. When the video data processor 130 adds a telltale image of another area to a normally operating data drive IC, the video data processor 130 generates video data such that an updated telltale is displayed in an area other than the telltale region being displayed by the normally operating data drive IC. Further, if the area to which the telltale will be added is smaller than the size of the telltale, the telltale can be resized such that the size thereof decreases and then updated.

Figure 4:
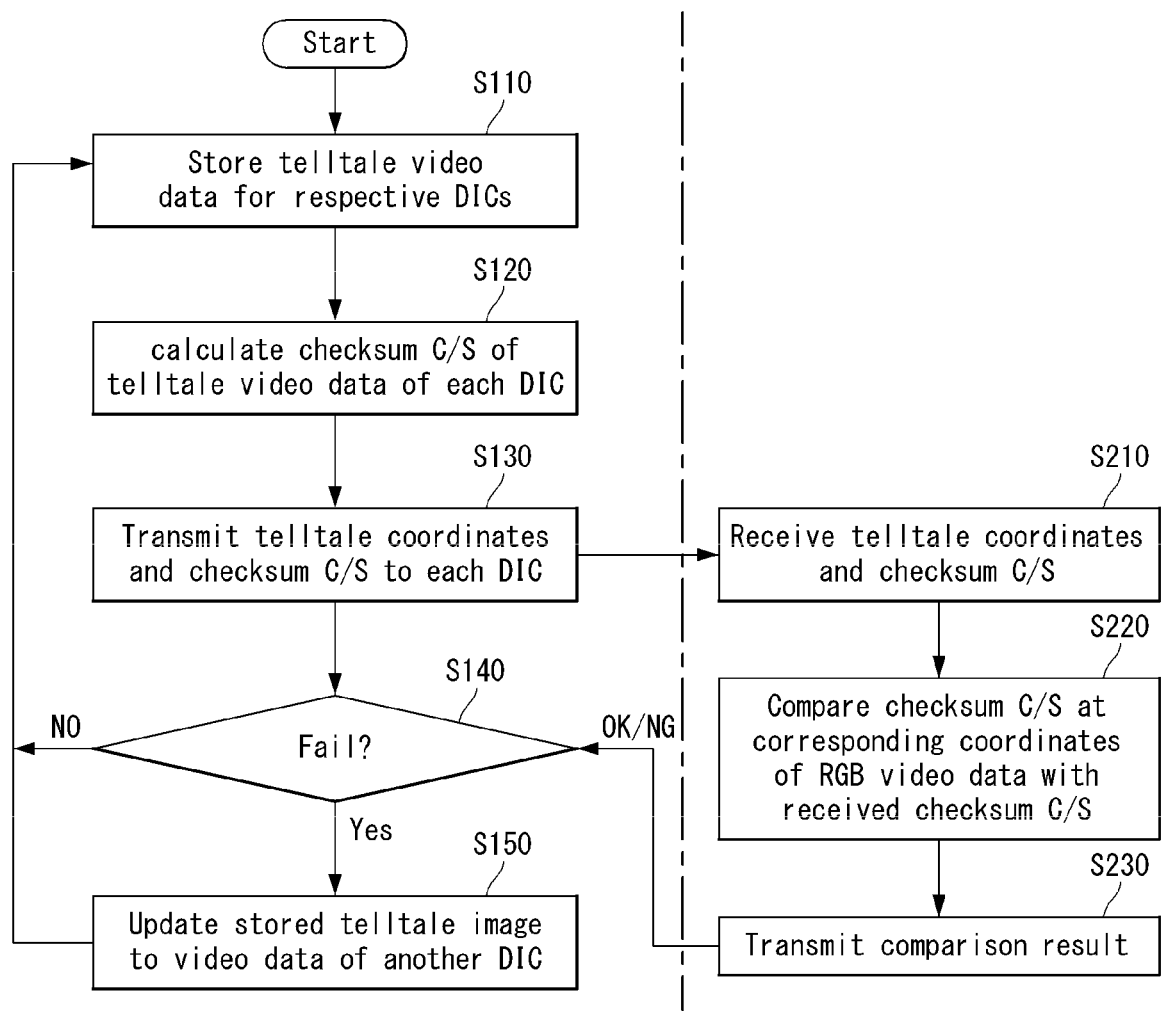
FIG. 4 is a control flowchart showing a driving method of the display device according to an embodiment of the present invention.

FIG. 4 is a control flowchart showing a driving method of the display device according to an embodiment of the present invention.

Referring to FIG. 4, the driving method of the display device according to an embodiment of the present invention can be divided into a process performed in the controller 100 and a process performed in the data drive ICs DIC #1 to DIC #3.

When the controller 100 confirms that a part of the data drive ICs DIC #1 to DIC #3 has failed, the controller 100 controls a telltale image of the data drive IC that has failed to be displayed in a display area of a normally operating data drive IC.

Video data of telltales displayed by the data drive ICs DIC #1 to DIC #3 is stored in the telltale manager 132 of the controller 100 (S110).

The checksum storage unit 122 calculates and stores a checksum C/S by which an error in telltale images can be checked in the data drive ICs DIC #1 to DIC #3 and transmits the calculated checksum C/S to the failure determination unit 134 (S120). The checksum storage unit 122 calculates the checksum C/S by which an error in video data can be checked in the data drive ICs DIC #1 to DIC #3 based on coordinates of telltales received from the external system.

The failure determination unit 134 transmits the checksum C/S and the coordinates of the telltales to the data drive ICs DIC #1 to DIC #3 (S130).

Thereafter, the failure determination unit 134 receives checksum comparison results from the data drive ICs DIC #1 to DIC #3 and determines whether any of the data drive ICs DIC #1 to DIC #3 has failed (S140). When it is determined that a specific data drive IC has failed, the failure determination unit 134 provides information on the data drive IC that has failed to the telltale manager 132.

The telltale manager 132 provides a telltale image corresponding to the data drive IC that has failed to the video data processor 130. Then, the video data processor 130 can update the telltale image corresponding to the data drive IC that has failed to video data of a normally operating data drive IC (S150).

Meanwhile, the data drive ICs DIC #1 to DIC #3 can feed back a video data reception channel failure and a telltale image display failure to the failure determination unit 134.

The data drive ICs DIC #1 to DIC #3 receive the coordinates of the telltales and the checksum C/S from the failure determination unit 134 (S210).

Each of the data drive ICs DIC #1 to DIC #3 compares a checksum C/S at the coordinates of video data provided to data lines with the coordinates and the checksum C/S therefor received from the failure determination unit 134 (S220).

Each of the data drive ICs DIC #1 to DIC #3 feeds back a comparison result representing whether the checksums C/S are consistent with each other (OK) or are not consistent with each other (NG) to the failure determination unit 134 (S230).

Figure 5:
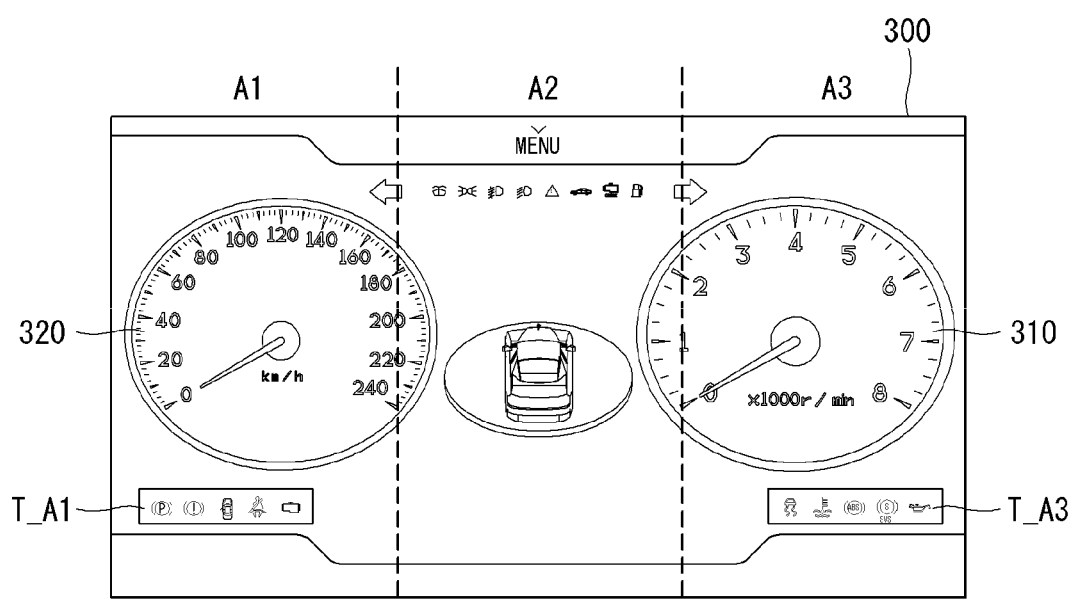
FIG. 5 is a diagram illustrating a screen composition provided by the display device according to the present invention.

FIG. 5 is a diagram illustrating a screen composition provided by the display device according to the present invention.

The display device can be mounted in a vehicle and display a gauge screen 300. The gauge screen 300 can display vehicle related information including vehicle state information representing a vehicle state and vehicle travel information related to traveling of the vehicle.

The gauge screen 300 can include a speedometer 320 indicating a running speed and a technometer 310 indicating an RPM. Further, the gauge screen 300 can include telltales T_A1 and T_A3 indicating turn-off of a safety control device, caution for temperature, an anti-clock braking system (ABS), insufficiency of an oil pressure, brake alarm, door opening, battery alarm, not wearing of a seat belt, and the like.

The gauge screen 300 can be displayed by a plurality of data drive ICs. In the case of the embodiment of FIG. 5, the screen is displayed according to three data drive ICs, the first data drive IC DIC #1 provides a data voltage to the data lines of the first display area A1, the second data drive IC DIC #2 provides a data voltage to the data lines of the second display area A2, and the third data drive IC DIC #3 provides a data voltage to the data lines of the third display area A3. The telltales T_A1 and T_A3 are respectively displayed in the first display area A1 and the third display area A3.

Figure 6:
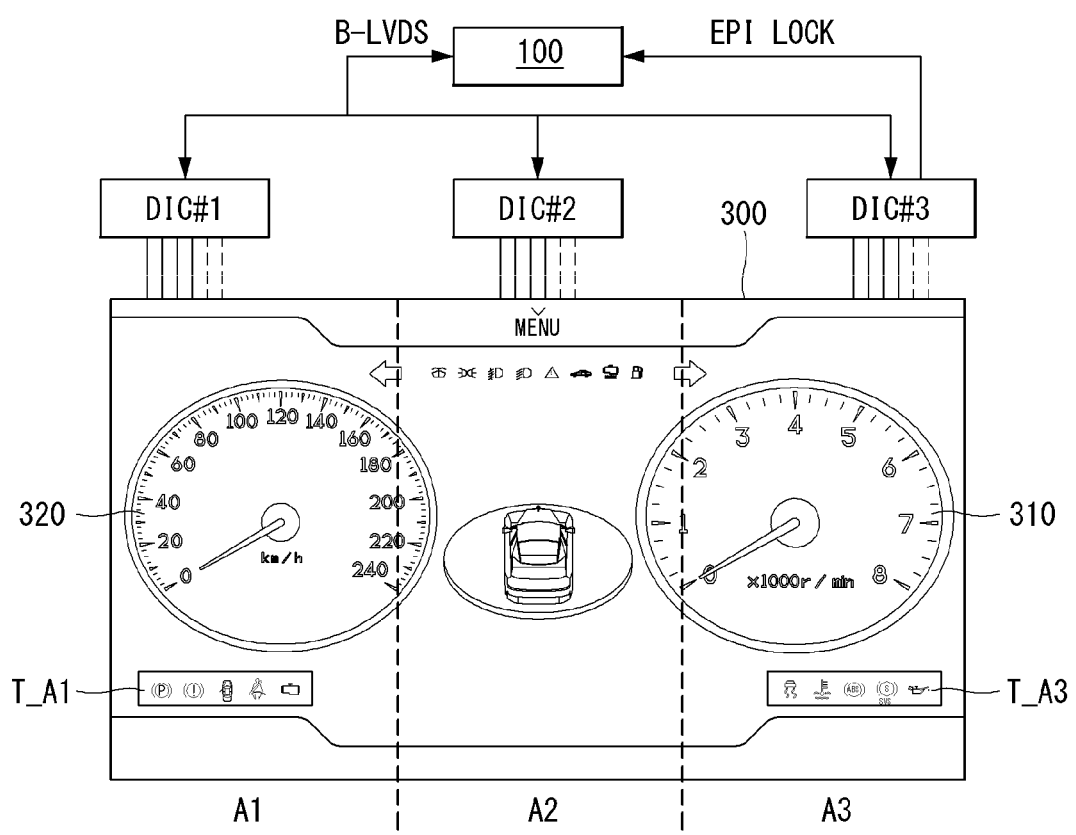
FIG. 6 illustrates a configuration of an interface between a controller and data drive ICs according to a first embodiment of the present invention.
Figure 7:
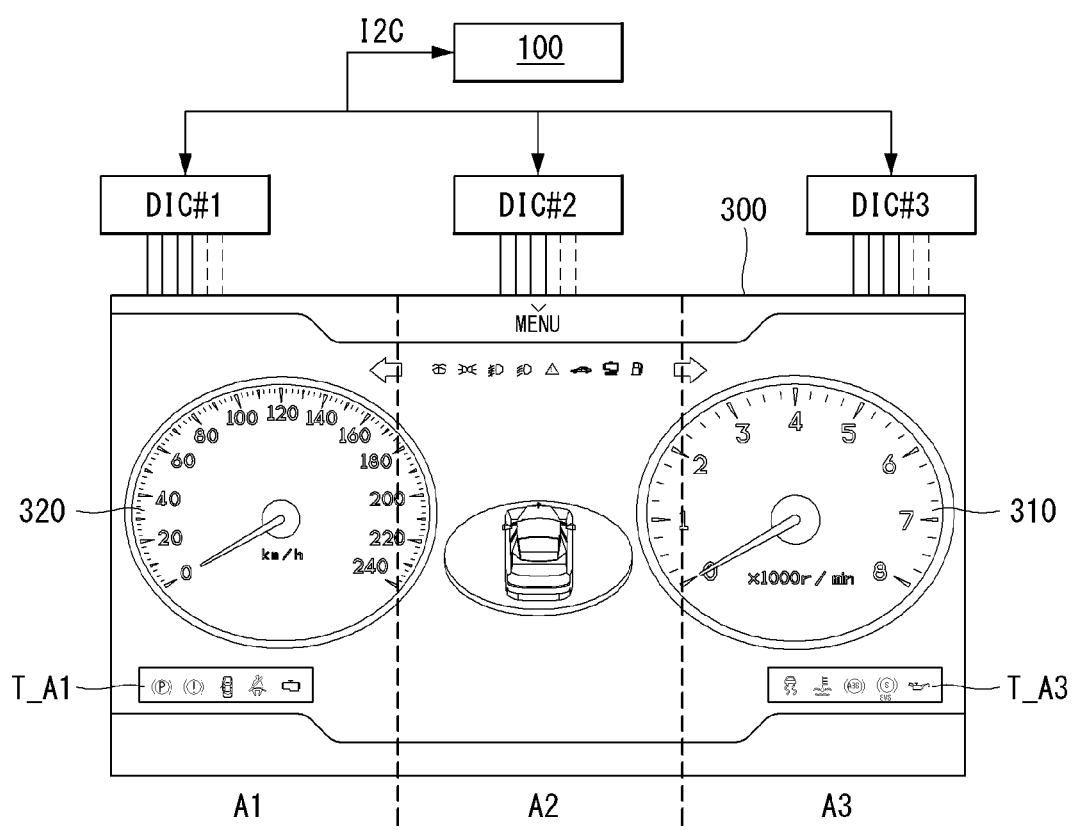
FIG. 7 illustrates a configuration of an interface between a controller and data drive ICs according to a second embodiment of the present invention.

FIGS. 6 and 7 illustrate configurations of interfaces applicable to signal transmission and reception between the controller 100 and the data drive ICs DIC #1 to DIC #3 according to an embodiment of the present invention.

The controller 100 according to the embodiment of the present invention transmits coordinates of telltales and a checksum C/S to the data drive ICs DIC #1 to DIC #3 and then receives feedbacks about presence or absence of a data transmission failure and checksum comparison results from the data drive IDs DIC #1 to DIC #3. Accordingly, bidirectional communication needs to be able to be performed between the controller 100 and the data drive ICs DIC #1 to DIC #3. Various interfaces that allow bidirectional communication can be applied as a communication interface between the controller 100 and the data drive ICs DIC #1 to DIC #3 and interfaces of two or more types can combined and used.

FIG. 6 illustrates a configuration of an interface between the controller and the data drive ICs DIC #1 to DIC #3 according to a first embodiment of the present invention.

Referring to FIG. 6, the controller 100 can transmit/receive signals to/from the data drive ICs DIC #1 to DIC #3 using a B-low voltage differential signaling (B-LVDS) interface. The controller 100 can receive checksum comparison results using lock signals LOCK fed back from the data drive ICs DIC #1 to DIC #3.

The controller 100 rearranges video data received from the external system and then transmits the rearranged video data to the data drive ICs DIC #1 to DIC #3 through the B-LVDS interface.

The data drive ICs DIC #1 to DIC #3 convert the input video data received from the controller 100 into positive/negative analog video data voltages and provide the positive/negative analog video data voltages to the data lines of the display panel PNL. The first data drive IC DIC #1 can provide a data voltage to the data lines of the first display area A1 in which the speedometer 320 and the telltale T_A1 are displayed, the second data drive IC DIC #2 can provide a data voltage to the data lines of the second display area A2 in which a menu MENU and heading of the vehicle are displayed, and the third data drive IC DIC #3 can provide a data voltage to the data lines of the third display area A3 in which the technometer 310 and the telltale T_A3 are displayed.

In addition, the controller 100 according to the embodiment of the present invention transmits the coordinates of the telltales and the checksum C/S to the data drive ICs DIC #1 to DIC #3 through the B-LVDS interface. Thereafter, the controller 100 can receive checksum comparison results using lock signals LOCK fed back from the data drive ICs DIC #1 to DIC #3.

FIG. 7 illustrates a configuration of an interface between the controller and the data drive ICs DIC #1 to DIC #3 according to a second embodiment of the present invention.

Referring to FIG. 7, signals can be transmitted and received between the controller 100 and the data drive ICs DIC #1 to DIC #3 using an I2C interface.

The controller 100 transmits the coordinates of the telltales and the checksum C/S to the data drive ICs DIC #1 to DIC #3 through the I2C interface. Thereafter, the controller 100 can receive checksum comparison results fed back from the data drive ICs DIC #1 to DIC #3 through the I2C interface.

Figure 8:
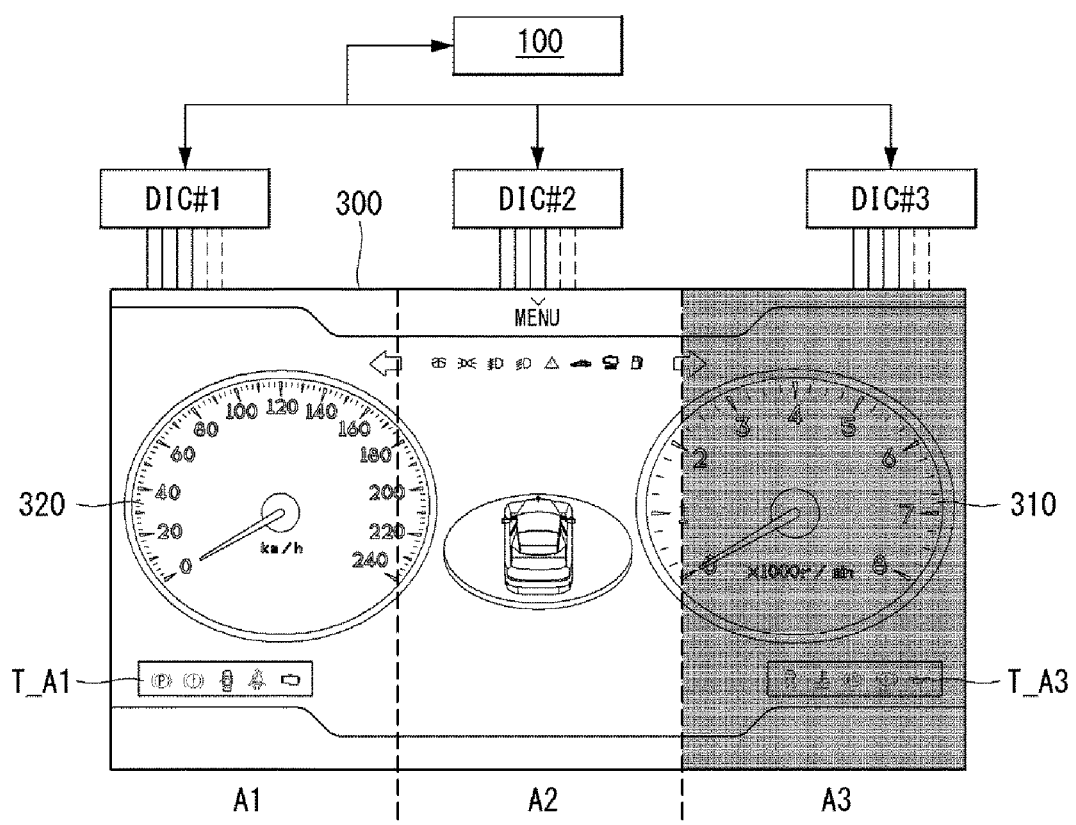
FIGS. 8 to 10 are diagrams for describing a screen display method of the display device according to an embodiment of the present invention.
Figure 9:
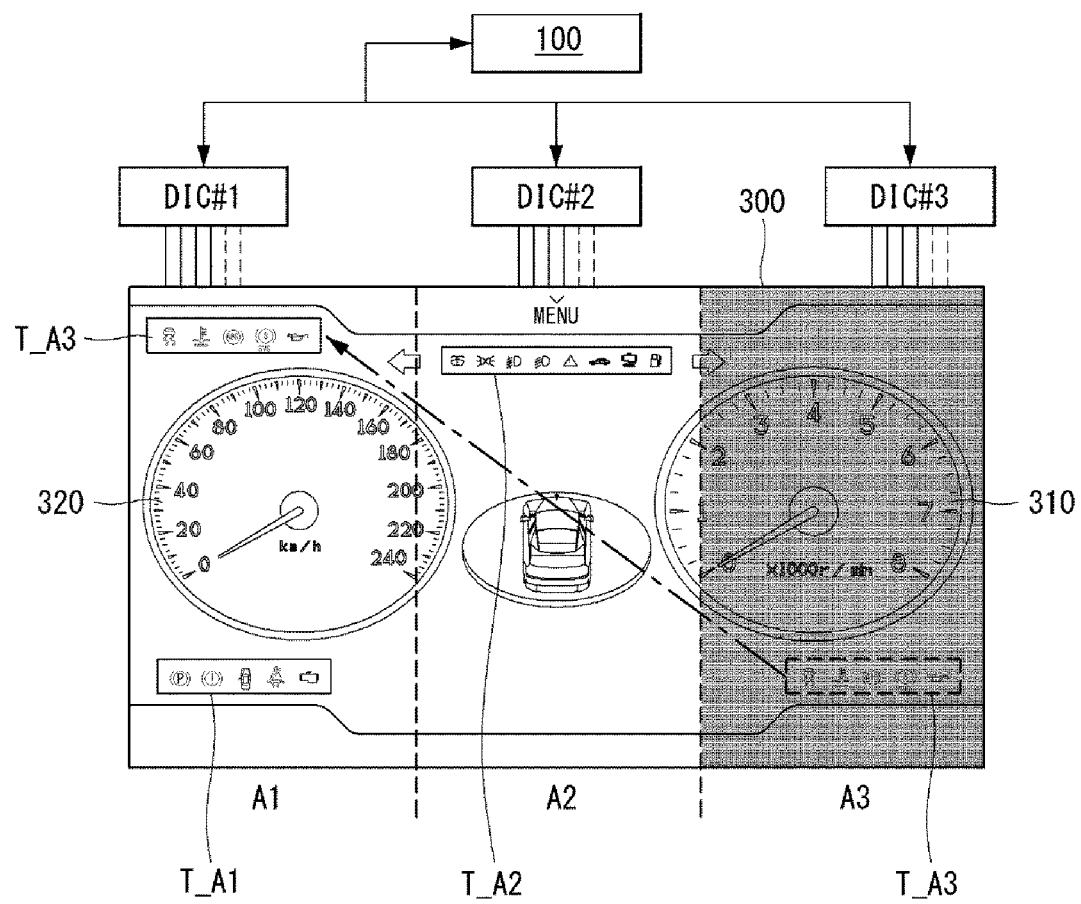
Figure 10:
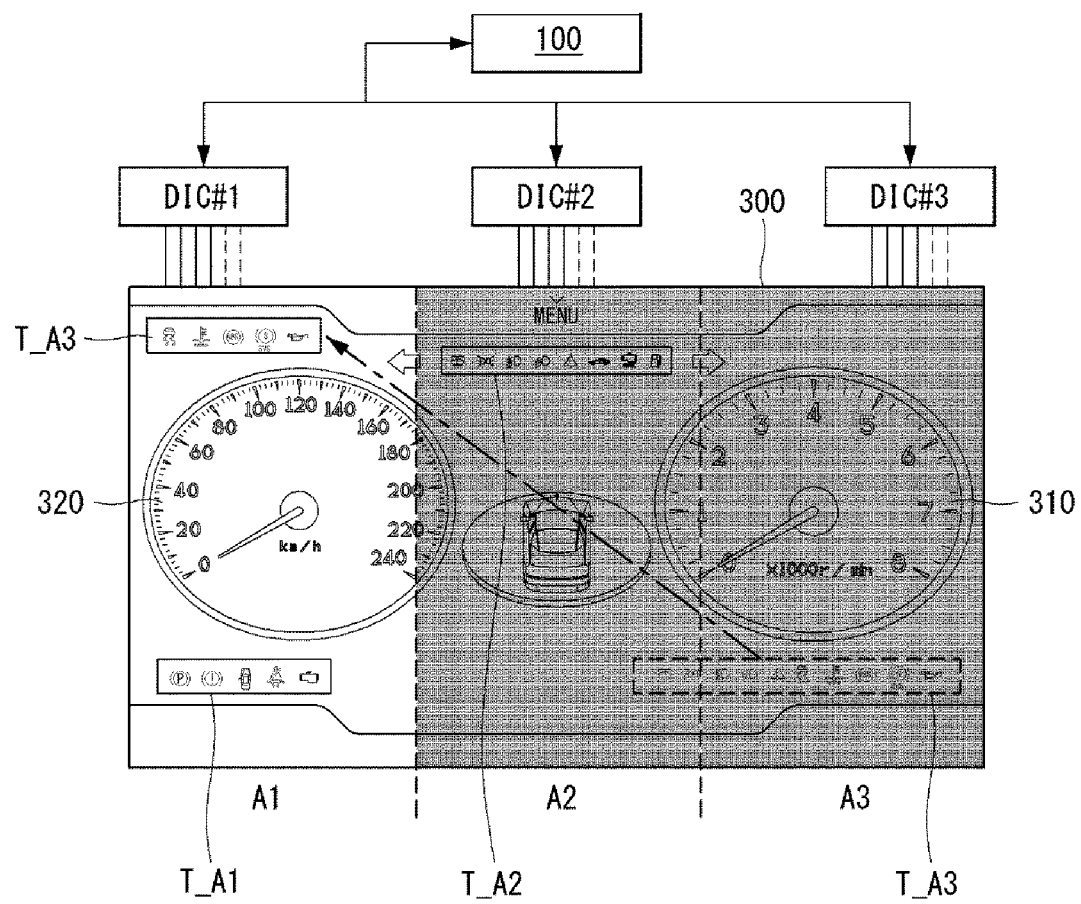

FIGS. 8 to 10 are diagrams for describing a screen display method of the display device according to embodiments of the present invention.

FIG. 8 is a diagram illustrating a gauge screen of a display device to which a conventional technique is applied, FIG. 9 is a diagram illustrating a gauge screen according to the first embodiment of the present invention, and FIG. 10 is a diagram illustrating a gauge screen according to the second embodiment of the present invention.

Referring to FIG. 8, the display device is mounted in a vehicle and can display a gauge screen 300 including vehicle related information. The controller 100 of the display device receives timing signals and video data from an external system such as a vehicle system. The controller 100 generates control signals for operations of gate drive ICs and data drive ICs based on the received timing signals, rearranges the video data and then transmits the control signals and the video data to the data drive ICs DIC #1 to DIC #3.

The first data drive IC DIC #1 provides a data voltage to the data lines of the first display area A1, the second data drive IC DIC #2 provides a data voltage to the data lines of the second display area A2 and the third data drive IC DIC #3 provides a data voltage to the data lines of the third display area A3 to display the gauge screen 300.

The gauge screen 300 includes a speedometer 320 indicating a running speed and a technometer 310 indicating an RPM. In addition, the gauge screen 300 can include telltales T_A1 and T_A3 indicating turn-off of a safety control device, caution for temperature, an anti-clock braking system (ABS), insufficiency of an oil pressure, brake alarm, door opening, battery alarm, not wearing of a seat belt, and the like.

The gauge screen 300 can be displayed by a plurality of data drive ICs. In the case of the embodiment of FIG. 5, the screen is displayed according to three data drive ICs, the first data drive IC DIC #1 can provide a data voltage to the data lines of the first display area A1 in which the speedometer 320 and the telltale T_A1 are displayed, the second data drive IC DIC #2 can provide a data voltage to the data lines of the second display area A2 in which the menu MENU and heading of the vehicle are displayed, and the third data drive IC DIC #3 can provide a data voltage to the data lines of the third display area A3 in which the technometer 310 and the telltale T_A3 are displayed.

When some of the data drive ICs DIC #1 to DIC #3 have failed, an abnormal image is displayed or an image is not displayed in a display area corresponding thereto. When the third data drive IC DIC #3 has filed, an abnormal image is displayed or an image is not displayed in the third display area A3. Accordingly, an image is not displayed in an area of the gauge screen 300 which corresponds to the third display area A3, and thus the telltale T_A3 included in the third display area A3 cannot be checked. When some of the data drive ICs DIC #1 to DIC #3 have failed in the conventional display device, a telltale of a screen area corresponding to a data drive IC that has failed cannot be checked as described above.

FIG. 9 is a diagram illustrating a gauge screen according to the first embodiment of the present invention.

The controller 100 according to the embodiment of the present invention stores video data of telltales in advance and calculates a checksum C/S for checking whether telltales displayed according to the data drive ICs DIC #1 to DIC #3 have failed. The controller 100 transmits rearranged video data, the coordinates of the telltales and the checksum C/S to the data drive ICs DIC #1 to DIC #3. Thereafter, the controller 100 receives feedbacks about communication states and whether the video data has an error from the data drive ICs DIC #1 to DIC #3 and determines a data drive IC that has failed. Further, the controller 100 can also determine a data drive IC that has failed when the controller 100 receives a feedback about a video data reception failure.

When the third data drive IC DIC #3 has failed, the controller updates prestored video data of the telltale T_A3 included in the third display area A3 to video data of the first data drive IC DIC #1.

Consequently, although the gauge screen 300 displays only the first display area A1 and the second display area A2, the telltale T_A3 included in the third display area A3 is moved to the first display area A1 and displayed therein. Accordingly, even when some of the data drive ICs DIC #1 to DIC #3 have failed, the corresponding telltales can be checked through another display area which is normally displayed.

FIG. 10 is a diagram illustrating a gauge screen according to the second embodiment of the present invention.

Referring to FIG. 10, the first data drive IC DIC #1 can normally operate and the second and third data drive ICs DIC #2 and DIC #3 can fail.

In this case, the gauge screen 300 displays only the first display area A1, and the second and third display areas A2 and A3 display an abnormal image or do not display an image.

The controller 100 can update prestored video data of the telltale T_A3 included in the third display area A3 to the video data of the first data drive IC DIC #1. When the telltale T_A3 is larger than a displayable area of the first display area A1, the controller 100 can resize the video data of the telltale T_A3 and update the resized video data to the video data of the first data drive IC DIC #1.

Consequently, although the gauge screen 300 displays only the first display area A1, the telltale T_A3 included in the second and third display areas A2 and A3 is reduced to a size that can be displayed in the first display area A1, moved to the first display area and displayed therein. Accordingly, even when some of the data drive ICs DIC #1 to DIC #3 have failed, the corresponding telltales can be checked through another display area which is normally displayed.

Those skilled in the art will appreciate that various modifications and variations can be made in the present invention without departing from the spirit or scope of the invention through the above description. Accordingly, the technical scope of the present invention should not be limited to the detailed description of the specification but should be determined by the claims.

According to the display device and the driving method thereof of the embodiments of the present invention, when a certain data drive IC has failed, information (e.g., important information) included in a display area of the data drive IC that has failed can be moved to another displayable area and displayed therein. In addition, according to the display device and the driving method thereof of the present invention, it is possible to check whether video data that is being displayed has an error as well as a physical channel failure of data drive ICs. Accordingly, when the present invention is applied to a display device displaying gauges for vehicles, it is possible to move a telltale corresponding to important information to a displayable area and display the telltale in the displayable area even when some areas of the display panel PNL have failed and thus cannot display the telltale.

What is claimed is:
1. A display device comprising:
a display panel including a plurality of data lines;
a plurality of data drive integrated circuit (ICs) configured to provide data voltages to the plurality of data lines; and
a controller configured to:
rearrange video data received from an external device and transmit region-wise video data to the plurality of data drive ICs, receive coordinates of information regions included in the video data and store video data of the information regions in advance, calculate a checksum for checking an error in the region-wise video data based on the coordinates, transmit the coordinates and the checksum to the data drive ICs and receive feedbacks about comparison results with respect to the checksum, and when a data drive IC that has failed is confirmed based on the feedback results, update video data of an information region displayed by the data drive IC to region-wise video data of a normal data drive IC and output the video data, wherein the data drive ICs determine whether the coordinates and the checksum received from the controller are consistent with corresponding coordinates and checksums of the data voltages provided to the data lines, and feed back the determination results.

2. The display device of claim 1, wherein the controller comprises:

a checksum storage unit configured to calculate the checksum and store the checksum along with the coordinates;

a failure determination unit configured to transmit the coordinates and the checksum to the data drive ICs, to receive feedbacks about whether checksums are consistent with each other, and to determine a data drive IC that has failed based on feedback results;

a telltale manager configured to store video data of information regions displayed by the plurality of data drive ICs and to provide video data of the information region displayed by the data drive IC that has failed; and a video data processor configured to update the video data of the information region displayed by the data drive IC that has failed to region-wise video data of a normal data drive IC and to output the video data.

3. The display device of claim 2, wherein the video data processor resizes the video data of the information region to a size displayable in the area displayed by the normal data drive IC.

4. The display device of claim 1, wherein the controller receives feedbacks about results of reception of control data and the rearranged video data from the data drive ICs, and when a data drive IC that has failed in data reception is confirmed based on the feedback results, the controller updates video data of the information region displayed by the data drive IC to the region-wise video data of the normal data drive IC and outputs the video data.

5. The display device of claim 1, wherein the controller and the data drive ICs transmit and receive the checksum, and the controller receives lock signals LOCK fed back from the data drive ICs.

6. The display device of claim 1, wherein the controller and the data drive ICs transmit and receive the checksum through an I2C interface.

7. The display device of claim 1, wherein the information regions include telltales indicating warning lights of a vehicle.

8. The display device of claim 1, wherein the display panel includes display areas segmented in a horizontal direction, and the plurality of data drive ICs respectively correspond to the segmented display areas and provide the data voltages to corresponding data lines.

9. A driving method of a display device including a display panel, a plurality of data drive integrated circuit (ICs) configured to provide data voltages to data lines of the display panel, and a controller configured to rearrange video data received from an external device and to transmit region-wise video data to the plurality of data drive ICs, the driving method comprising:

receiving coordinates of information regions included in the video data;

storing video data of the information regions;

calculating a checksum for checking an error in the region-wise video data based on the coordinates;

transmitting the coordinates and the checksum to the data drive ICs and receiving feedbacks about comparison results with respect to the checksum; and when a data drive IC that has failed is confirmed based on the feedback results, updating video data of an information region displayed by the data drive IC to region-wise video data of a normal data drive IC and outputting the video data, wherein the data drive ICs determine whether the coordinates and the checksum received from the controller are consistent with corresponding coordinates and checksums of the data voltages provided to the data lines, and feed back the determination results.

10. The driving method of claim 9, further comprising:

receiving feedbacks about results of reception of control data and the rearranged video data from the data drive ICs; and when a data drive IC that has failed is confirmed based on the feedback results, updating video data of the information region displayed by the data drive IC to the region-wise video data of the normal data drive IC and outputting the video data.

11. The driving method of claim 9, wherein the updating of the video data of the information region displayed by the data drive IC that has failed to the region-wise video data of the normal data drive IC and outputting the video data when the data drive IC that has failed is confirmed based on the feedback results comprises:

resizing the video data of the information region to a size displayable in the area displayed by the normal data drive IC and updating the video data.

* * * * *